United States Patent [19]

Cresswell

[11] Patent Number: 4,861,058

[45] Date of Patent: Aug. 29, 1989

[54] DISASSEMBLABLE SULKY VEHICLE

[76] Inventor: Thomas A. Cresswell, P.O. Box 834, Palm Desert, Calif. 92261

[21] Appl. No.: 122,061

[22] Filed: Nov. 18, 1987

Related U.S. Application Data

[63] Continuation-in-part of Ser. No. 13,363, Feb. 11, 1987, Pat. No. 4,757,868, which is a continuation-in-part of Ser. No. 861,365, May 9, 1986, Pat. No. 4,708,219.

[51] Int. Cl.[4] .......... B62D 27/06; B62K 5/06; B62K 15/00

[52] U.S. Cl. .......... 280/278; 180/13; 180/208; 180/907; 280/287

[58] Field of Search .......... 180/11, 13, 208, 210, 180/906, 907; 280/242 WC, 278, 287, 282, DIG. 6; 297/DIG. 4; 292/150

[56] References Cited

U.S. PATENT DOCUMENTS

| | | | |
|---|---|---|---|
| 2,771,145 | 11/1956 | Peters | 180/13 |
| 3,425,708 | 2/1969 | Sato | 280/DIG. 6 |
| 3,486,765 | 12/1969 | Turner | 280/287 |
| 4,392,690 | 7/1983 | Anderson | 280/242 WC |

FOREIGN PATENT DOCUMENTS

| | | | |
|---|---|---|---|
| 588995 | 5/1925 | France | 292/150 |
| 2118495 | 11/1983 | United Kingdom | 280/287 |

*Primary Examiner*—Charles A. Marmor
*Assistant Examiner*—Mitchell J. Hill
*Attorney, Agent, or Firm*—Learman & McCulloch

[57] ABSTRACT

A disassemblable three wheeled, sulky vehicle for the handicapped and others desiring assistance has a steerable front wheel drive unit comprising a steering column mounting assembly with a motor driven wheel. A sulky frame assembly supports a pair of transversely spaced apart rear wheels in tricycle formation with said front wheel and a coupling assembly detachably secures the front wheel drive unit and sulky frame assembly. A seat structure is mounted on the upper end of said frame assembly which comprises a bottom frame member which has a pair of upwardly extending, relatively foldable frames for supporting said seat structure.

16 Claims, 3 Drawing Sheets

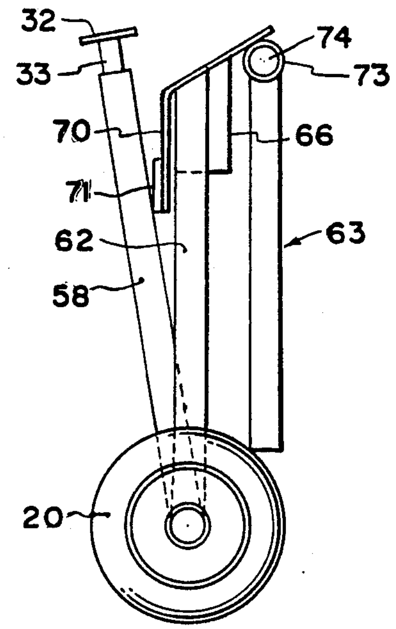
FIG.3
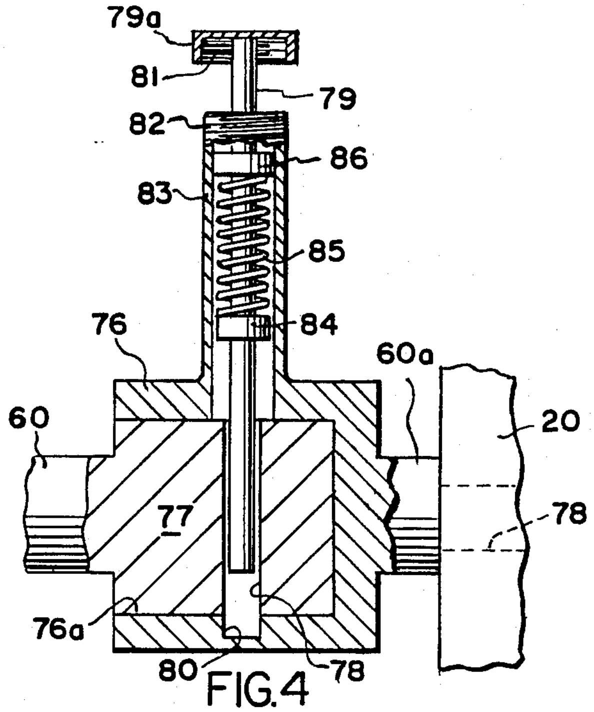
FIG.4
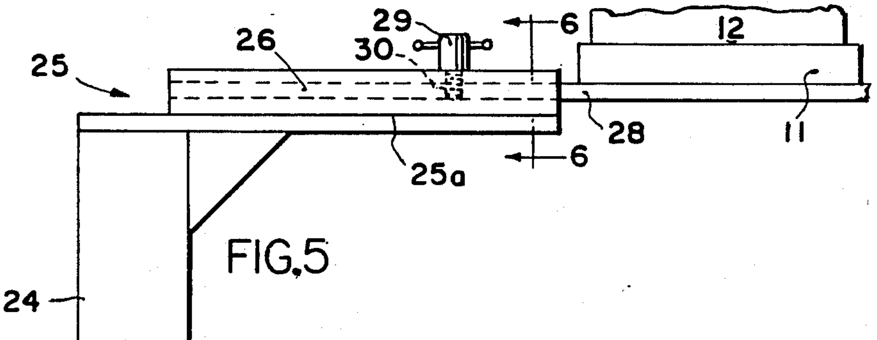
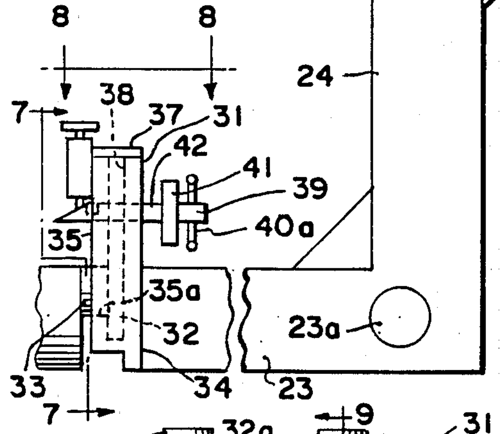
FIG,5
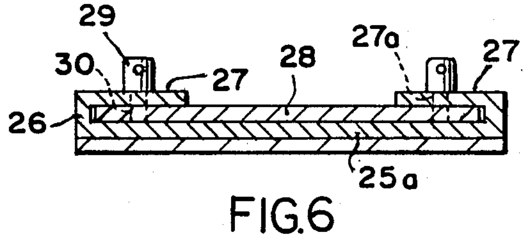
FIG.6
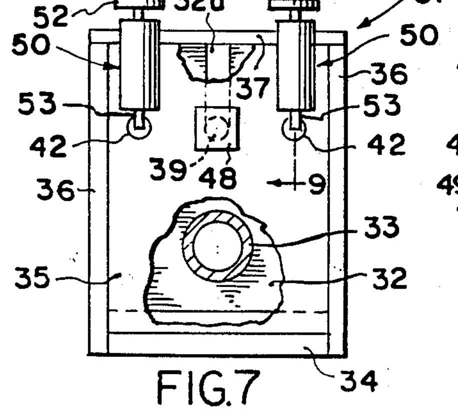
FIG.7
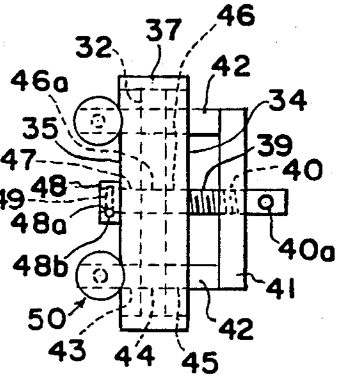
FIG.8
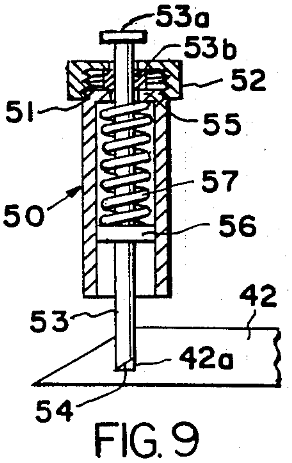
FIG. 9

DISASSEMBLABLE SULKY VEHICLE

The present application is a continuation-in-part of my application Ser. No. 013,363 filed Feb. 11, 1987, (now U.S. Pat. No. 4,757,868, issued July 19, 1988), which is a continuation-in-part of my application Ser. No. 861,365 filed May 9, 1986 (now U.S. Pat. No. 4,708,219 issued Nov. 24, 1987).

FIELD OF THE INVENTION

This invention relates to knockdown sulky components which rigidly latch in assembled position but are transportable in disassembled position in an automobile trunk or a suitcase.

BACKGROUND OF THE INVENTION

The present invention relates to motor-driven personal vehicles, particularly for patients and others who have some physical disability, but are sufficiently physically active to be able to assemble and disassemble a demountable sulky, and transfer the components to and from a vehicle trunk, or to luggage which can accompany them on an airline trip. Because conventional wheelchairs are bulky, it is not feasible to transport them in even the larger automobiles. Even when the wheelchair is of the foldable type and can be placed in a vehicle trunk, it leaves practically no room in the trunk for anything else. In the case of those wheelchairs where a motorized drive unit is attachable and detachable from the wheelchair, as disclosed in U.S. Pat. Nos. 3,921,744 and 4,503,925, the motorized drive unit, when detached, needs to be separately transported in the vehicle. Normally, the attachable drive units disclosed in the aforementioned patents provide a front wheel, driven by an electric motor which is supported on a steering post-frame assembly which further supports a battery for supplying the necessary electrical current to the electric motor, and such units are commercially available. However, to my knowledge, no seat supporting sulky vehicle which could be broken down into compact component pieces has been commercially available. One of the prime reasons has been the lack of a safe and rigid latch system which could be engaged and disengaged by hand, without the use of tolls. Latching systems of various types have been proposed for various vehicles as disclosed, for instance, in U.S. Pat. Nos. 4,452,327 and 4,203,612, but none of these vehicular latch constructions satisfy all of the necessary criteria and provide the stability which is necessary.

SUMMARY OF THE INVENTION

The present invention is designed particularly as a comprehensive aid for arthritics, particularly those suffering from rheumatoid arthritis. These people, because of a weakness in the extensor muscles of the thighs, have difficulty in arising from chairs.

One of the prime objects of the present invention is to provide a sulky vehicle attachment, for a powered steerable front wheel assembly, which is of tetrahedron construction and permits the arthritic to be seated in a more elevated position which facilitates the ability of the patient to demount from the vehicle.

Still another object of the invention is to provide a disassemblable sulky vehicle of the character described which is sufficiently strong to perform its functions but can be formed of a lightweight material such as aluminum.

Another object of the invention is to design a demountable sulky which readily disconnects from the drive unit which provides its driven front wheel, and then further can be readily broken down by a handicapped person without tools into separate component parts which will readily fit into available spaces in an otherwise packed automobile trunk for transport.

Still another object of the invention is to provide a sulky unit which essentially breaks down into separate rear wheels, a tow bar, a fold-up, seat-bearing frame, and a seat, none of which when, separated from the others, takes up much space.

Still another further object of the invention is to provide a virtually fool-proof latching system for connecting the various sulky components, which will provide the stability and peace of mind which is necessary for patients using the vehicle.

Another object of the invention is to provide a readily manufactured, disengageable latching system which provides safe, rigid support for the various assembled sulky components, while still providing for ease of assembly and disassembly.

Other objects and advantages will become apparent by reference to the accompanying drawings, and the following specification.

IN THE DRAWINGS

FIG. 3 is a side elevational view of the sulky frame only, shown in folded position;

FIG. 4 is an enlarged, fragmentary, sectional rear elevational view illustrating the manner in which the wheels detachably secure to the sulky axle stubs;

FIG. 5 is an enlarged, fragmentary, side elevational view showing the sulky tow bar, and illustrating its connection to the sulky frame;

FIG. 6 is a fragmentary, transverse, sectional elevational view thereof;

FIG. 7 is an enlarged, transverse, sectional elevational view taken on the line 7—7 of FIG. 5;

FIG. 8 is an enlarged, fragmentary, top plan view of the tow bar connection taken on the line 8—8 of FIG. 5;

FIG. 9 is an enlarged, fragmentary, sectional side elevational view of the latch mechanism;

Figure 1:
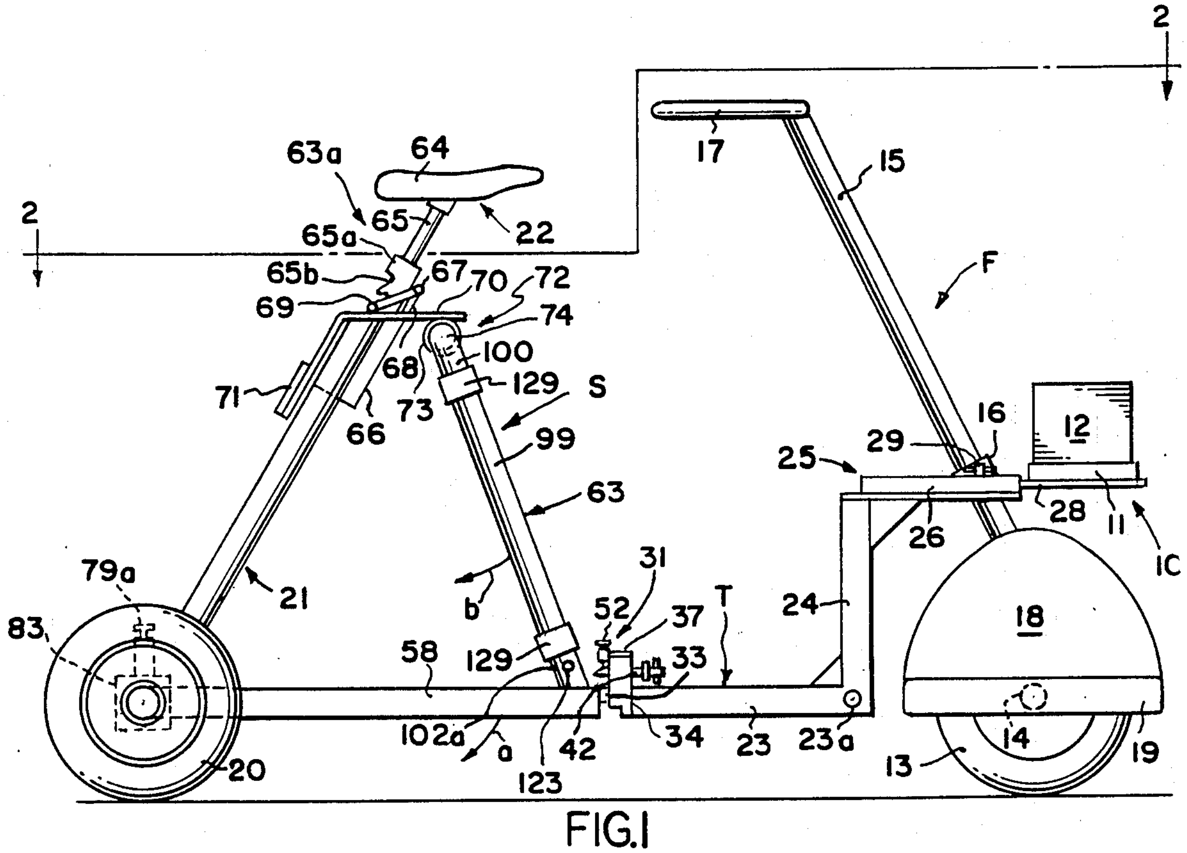
FIG. 1 is a side elevational view of the vehicle in assembled operative position.
Figure 2:
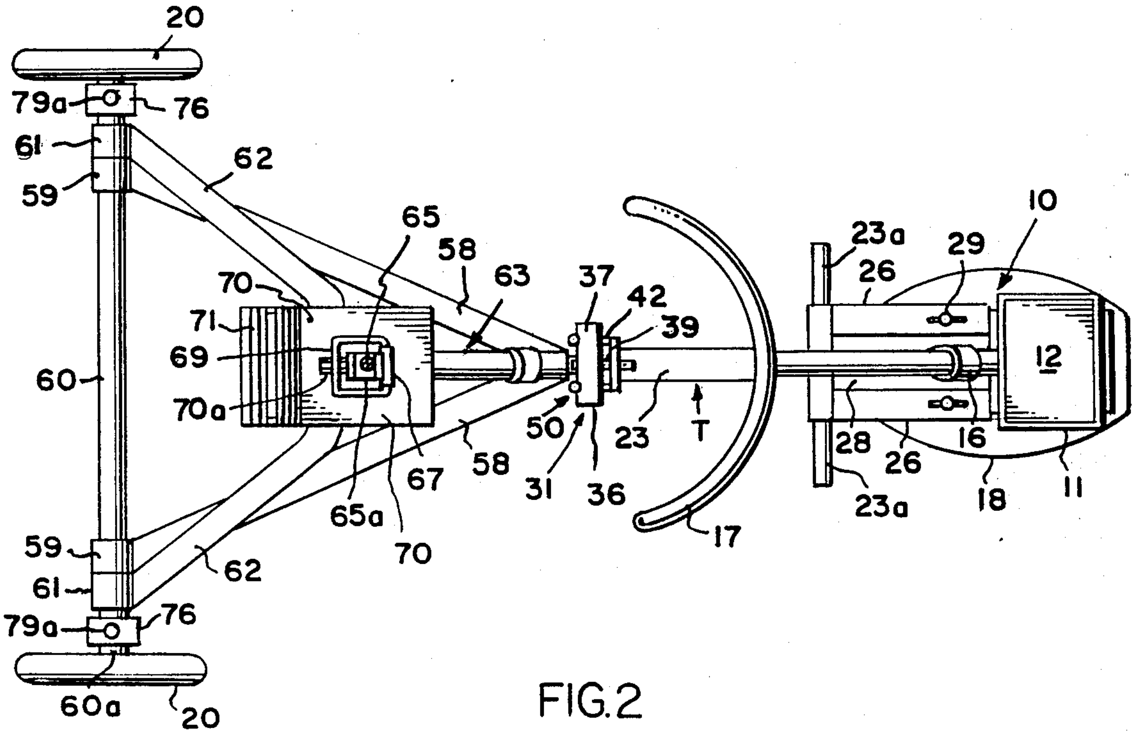
FIG. 2 is a top plan view thereof taken on the line 2—2 of FIG. 1.

Referring now more particularly to the accompanying drawings, and in the first instance to FIGS. 1 and 2, wherein a fully assembled three wheeled vehicle is illustrated, it is to be understood that the front wheel assembly, generally designated F, is available in the market place as a steerable drive wheel assembly which can be detachably connected to a wheel chair or the like. In this connection, attention is directed to U.S. Pat. No. 4,503,925 wherein such a powered and steerable front wheel assembly is disclosed. Attention is also directed to applicant's co-pending applications Ser. Nos. 861,365 and 013,363, now U.S. Pat. Nos. 4,708,219 and 4,757,868, respectively, which both illustrate such steerable drive wheel assemblies and are incorporated herein by reference.

As disclosed, the front wheel assembly may include a frame part generally designated 10 which includes a holder 11 for a battery 12. A steerable front wheel 13 is supported by an axle 14 carried by wheel forks (not shown) which are connected to a steering post 15, post 15 extending through a steering post socket assembly 16 forming part of the frame member 10. The steering post 15 is formed in two parts, the upper of which is detachable from the lower, and includes a steering handle 17. Controls may be provided on the handle 17 for controlling the speed of travel of the wheel 13, which is powered by a suitable electric motor (not shown) housed in a motor housing 18. The motor is connected by suitable gearing (not shown) to, and drives, the live axle 14. A bumper 19 is fixed to the motor housing 18 in the usual manner.

Provided rearwardly of the front wheel assembly F is a rideable sulky assembly, generally designated S, which is comprised of a pair of rear wheels 20 releasably connected to a tetrahedron framework of special design generally designated 21, which releasably mounts a seat assembly generally designated 22. At its front end, the sulky frame assembly 21 connects to a tow bar member, generally designated T, which couples the sulky frame S to the front wheel assembly F. Tow bar T is of angular or S-shaped configuration and includes (see FIG. 5) a tubular connecting bar 23 and an upright portion 24 to which a connecting latch housing generally designated 25 is fixed as shown. As FIG. 6 indicates, the base plate **25*a* of housing 25 includes upstanding sides 26 having inturned flange portions 27 providing a housing for receiving a plate 28 which extends rearwardly from the frame member 10. Threaded openings 27*a* are provided in the inturned flange portions 27 to receive threaded handle operated screw members 29 which extend into threaded openings 30 also provided in the plate 28**.

Foot rests **23*a* may be fixed to the front end of connecting bar 23 as shown to support the feet of the person seated on seat assembly 22. At its rear end the connecting bar 23 incorporates a downwardly opening scabbard member generally designated 31 for receiving a hoe blade 32 provided on a horizontal cylindrical protrusion 33 which projects forwardly from the sulky frame assembly 21. The scabbard assembly is made up of a front plate 34 and a rear plate 35 which are connected by end walls 36 and a top wall 37 to provide a slit 38 for snugly receiving the hoe blade 32 which is welded or otherwise fixed to the connecting member 33. It will be noted that the lower end of the rear plate 35 includes a socket 35*a* in which the member 33** is received.

As FIG. 8 particularly indicates, a screw member 39, which rotates but is prevented from moving axially, is received in a threaded opening 40 provided in a U-shaped stud plate 41 which has projecting studs 42 passing slidably through openings 43, 44, and 45 provided in the plate 34, hoe blade 32, and plate 35 respectively. The upper end of the hoe blade 32 is slotted, as shown at **32*a* (FIG. 7), to pass the screw 39, and openings 46 and 47 are provided in the scabbard plates 34 and 35 to similarly freely pass the screw 40, which is provided with a handle 40*a*. The screw 40 is prevented from moving axially by a collar 48, fixed to the rear scabbard plate 35, which has a threaded opening 48*a* for a set screw 48*b* received in an annular groove 49 in the end of screw 39. Rotation of screw 39, then, causes the plate 41 and studs 42** to move axially as it rotates.

Fixed to the rear plate 35 are a pair of detent housings 50 which, as shown in FIG. 9, are externally threaded at their upper ends as at 51 to receive an internally threaded cap 52 slidably provided on a plunger member 53 between the plunger top cap **53*a* and a collar 53*b* fixed to plunger 53. The lower end of plunger 53 has an inclined face 54. Fixed to the upper end of the housing 50 is an internal flange 55 which co-operates with the spring stop 56 fixed to plunger 53 to maintain a coil spring 57 in a condition of compression. Spring 57, which is under compression even when the cap 52 is in the position shown in FIG. 9, operates to urge the plunger 53 inwardly to maintain it in a normally inward position. However, when cap 52 is unscrewed and plunger 53 is pulled upwardly to further compress spring 57, the plunger end 54 is removed from the recess 58 in the stud 42 in which plunger end 54 is received when the sulky is in the latched position illustrated in FIG. 9** as shown.

The sulky frame disclosed is foldable when disengaged, and comprises a V-shaped lower frame 58 with side rail members provided with collars 59 at their ends, which are received rotatably on an axle support shaft 60. Also received on the shaft 60, but fixed thereto, are the collars 61 provided on a rear frame 62 of U-shaped configuration which, together with a front strut assembly 63, supports disengageable seat assembly S. This seat structure S is identical to the seat structure described in my co-pending application Ser. No. 013,363 (now U.S. Pat. No. 4,757,868), and includes a bicycle-type seat 64 fixed to a seat post 65 which is received within a seat socket 66. The lower portion of the seat post 65 is enlarged as shown at **65*a* and provided with a series of vertically spaced recesses 65*b*. The section 65*a* may be T-shaped in cross-section to pass snugly but slidably through a T-shaped slot 70*a* provided through a plate 70 fixed to frame 62. Pivotally mounted in a bearing 67 at the upper end of fixed mount 68 is a latch 69 which is received in one of the recesses 65*b* to mount the seat 64 in the desired vertical position. The angle shaped mount plate 70, to which seat post socket 66 and support 68 are fixed, has a storage scabbard 71 provided on its dependent portion for reception of the blade 28** for storage purposes in the manner described in co-pending application Ser. No. 013,363 (now U.S. Pat. No. 4,757,868).

The upper end of strut assembly 63 is hingedly connected to the plate 70 at 72 so that when it is disengaged from a stub-portion **102*a* provided on the lower frame 58 it will be foldable to the position shown in FIG. 3. The hinge connection 72 may comprise a sleeve 73 welded to the lower face of plate 70 which receives a shaft 74 provided on a stub 100 which releasably connects to the upper end of strut 63. To reach the folded position shown in FIG. 3, frame 58 is swung about axle 60 through an angle a approaching 270° from the position in which it is shown in FIG. 1. Strut 63 may be disconnected from the stub 102*a*** and swung as at b inwardly to folded position.

In FIG. 4, the manner in which the axle shaft 60 is detachably connected to each of the wheels 20 is disclosed. A fitting 76 is provided with a cubical socket **76*a* at each end of the axle shaft 60** for receiving a cubical end 77 provided on each end of the shaft 60. Each fitting 76 further includes a shaft portion 60a on which wheel 20 is rotatably secured. Essentially the same locking device previously described with reference to the detent assembly 50 is utilized here to detachably secure the fitting 76 to the end of the axle shaft. Each shaft end 77 is provided with a bore 78 through which a spring pressed plunger or bolt 79 extends, the bolt 79 being normally spring biased to be received within a socket 80 provided in the one wall of fitting 76. As previously, plunger 79 has a cap 79a at its upper end which is internally threaded as at 81 to be received on the eternally threaded upper end 82 of spring casing 83. A spring stop 84 fixed to plunger 79 is normally forced downwardly by the coil spring 85 which also bears on a collar 86 fixed within casing 83. In FIG. 4, the plunger 79 is shown in a position of partial disengagement, cap 80 having been rotatably disengaged from the threads 82 and then pulled upwardly.

Figure 4A:
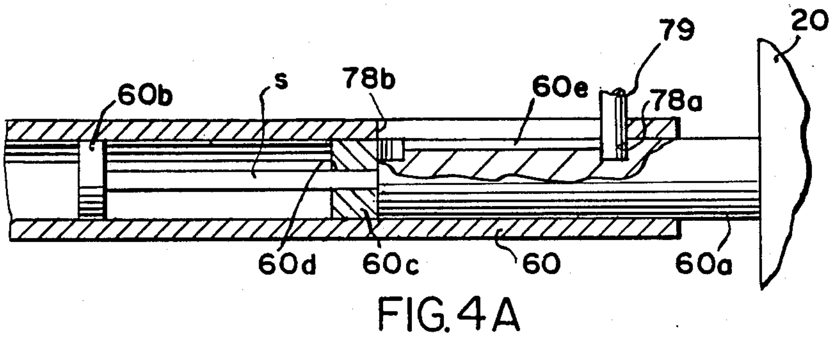
FIG. 4A is a view similar to FIG. 4 showing a modification in which the axle structure is expandable.

In FIG. 4A the tube 60 is shown as telescopically receiving an axle 60a having spaced apart detent openings 78a and 78b in which plunger 70 of the detent structure shown in FIG. 4 can be selectively received. Axle 60a has a stop 60b adapted to come into engagement with plug bearing 60c fixed in tube 60 when the detent is received in opening 78a. To prevent rotary movement of the axle 60a on which wheel 20 is rotatably mounted, the stem 60 to which stop 60b is fixed can be of square cross-section and so can the opening 60d in bearing 60c. Stability is increased when the axles 60a are shifted to the outward position in which detents 70 engage in openings 78a. Plunger end slide groove 60e connects the openings 78a and 78b and plug 60c stops the axle 60 in the proper position for openings 78a and 78b.

The strut assembly 63 may be of exactly the construction disclosed in FIGS. 11–15 and 22–23 of my co-pending application Ser. No. 013,363 (now U.S. Pat. No. 4,757,868) and will not be described here in detail. The same numerals used in that co-pending application have been used in the present instance. Sleeves 129 are movable axially on tubular member 99 to uncover tongue and groove sections provided in the stub sleeves 100 and 102a, respectively, and plugs (not shown) which interfit with the tongues are provided in central tube section 99. For purposes of disengagement, the mid section 99 may be entirely removed from the sections 100 and 102a in the manner disclosed in my pending application. Alternatively, only the lower end of the tube section 99 may be removed from the lower sleeve section 102a, as noted, and the strut assembly 63 may be swung toward the rear frame 62 in the manner disclosed in FIG. 3.

THE OPERATION

In operation the vehicle is operated in the FIG. 1 condition until it is desired to demount the various components and store them in the trunk or luggage of the user who may, for example, be taking a lengthy automobile trip. The first step can be the removal of the steering handle 15 from the socket 16 and the lower end of the handle 15 to which it releasably connects. The seat 64 is then disengaged by disengaging the latch 67 from the notch 65b in which it is engaged, and lifting it out of socket 66. The demounting takes place by moving the seat downwardly while lifting the latch 67, and then lifting the seat 64 upwardly. Handle 40a is then manipulated to turn the screw 40, after each of the caps 52 have been rotated to back them out of threaded engagement and the plunger 53 are raised to remove the plungers 53 from the recesses 58. The screw 40 is manipulated to move the plate 41 and the studs 42 until they clear the openings 43 in the plate 34. This will permit the scabbard housing 31 to be lifted off the hoe blade 32. By backing off the screw members 29 shown in FIG. 6, the front wheel assembly frame plate 28 can be withdrawn from the member 26 so that the connecting bar 23 is disengaged from the front wheel frame assembly. Then, with front strut 63 disengaged from the stub 102a fixed to bottom frame 58, the sulky assembly S may be folded to the position shown in FIG. 3.

When the folded sulky assembly S is to be carried in a suitcase rather than in the trunk of an automobile, the wheels 20 may be removed by rotating the caps 79a of the plungers 79 shown in FIG. 4 to back them off the threads 82, and by then pulling upwardly on the caps 79a to disengage the plungers 79 completely from the openings 78 in each end 77 of the axle shaft 60. Battery 12 is, of course, also disconnected from the electric motor provided in the motor housing 18 and removed from the enclosure 11 in which it is slidably received.

It is important to understand that the vehicle frame is subjected to torque forces when it is in use such as, for example, when it passes over a bump or a curb, or when one wheel is received in a depression. Such torque forces may be lateral as well as longitudinal and the various demountable components must be so tightly locked that no play is permitted, and the required rigidity and stability are maintained. Arthritics, as noted, need the relatively high seat which the present vehicle provides and would not use such a vehicle if there was an instability or tippy feeling encountered in its use.

A FURTHER EMBODIMENT

Figure 10:
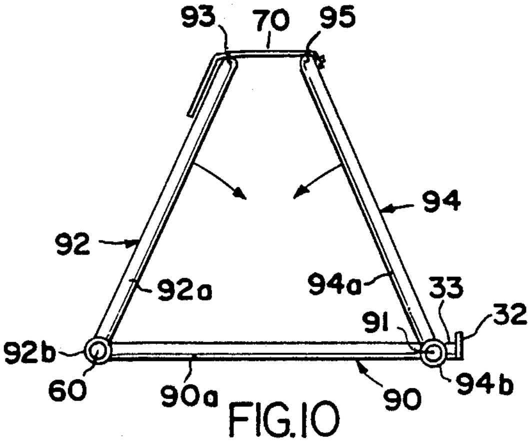
FIG. 10 is a side elevational view illustrating another embodiment in which the sulky frame is collapsible when disengaged.

In FIG. 10 I have shown an alternative frame structure in which the bottom frame mounts the wheels 20 in the manner previously described. The bottom frame is however, a rectangularly shaped member generally designated 90 and having side legs 90a. The front portion 91 of the frame 90 fixedly mounts the projection 33 and hoe blade 32. A U-shaped rear frame generally designated 92, has legs 92a with collars 92b which are rotatably received on the axle shaft 60. The web 93 of the rear frame 92 is hingedly connected, as at 93a, to the angular seat plate 70 previously described, which similarly may have the storage scabbard 71 previously described. Also provided, is a U-shaped front frame generally designated 94, having side legs 94a provided with collars 94b which are rotatably received on the front portion 91 of bottom frame 90. The upper end or web 95 of front frame 94 is shown as having threaded openings 95a which mate with threaded openings 96 provided in a curvilinear socket end of the seat mount plate 71 for releasably securing the front frame 94 in position as with thumb screws 97. The curvilinear of the front end of plate 70 corresponds to the diameter of web section 95 so that an internesting of the two members results.

Figure 11:
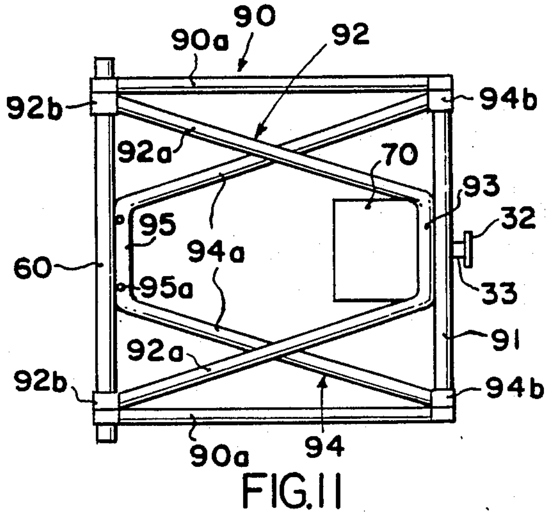
FIG. 11 is a top plan view thereof, showing the sulky frame parts in collapsed position.
Figure 12:
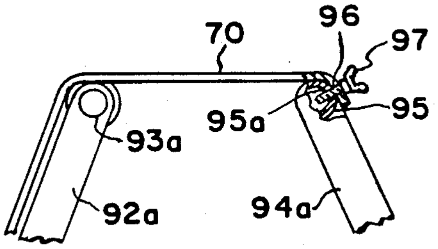
FIG. 12 is a fragmentary, enlarged, partly sectional elevational view illustrating the manner in which the frame parts connect to the seat plate in the further embodiment.

To demount the sulky frame disclosed in FIGS. 10–12, it is necessary to remove the screws 97 and then fold the front frame 94 downwardly to nest within the bottom frame 90 after which the rear frame 92 is folded down similarly, as shown in FIG. 11.

Alternatively to the construction shown, it would be possible for the foldable frame sections 92 and 94 which support the seat plate 70 to be mounted for pivotal movement on the side rails 90a and 90b.

While only several embodiments of the invention have been described in detail, it will be apparent to those skilled in the art that the disclosed embodiments may be modified. Therefore, the foregoing description in all aspects is to be considered exemplary rather than limiting in any way and the true scope of the invention is that defined in the following claims.

What is claimed is:

1. A demountable three-wheeled, sulky vehicle for the handicapped and others desiring assistance comprising:
   a. a front wheel steering unit comprising a steering column mounting assembly and a front wheel;
   b. sulky frame means for connection to said front wheel steering unit including rigid axle means for supporting a pair of transversely spaced apart rear wheels in tricycle formation with said front wheel, and including rear wheels on said axle means; said axle means including transversely spaced axles and a rigid axle support member rigidly spanning said axles;
   c. coupling means for detachably securing the front wheel steering unit and sulky frame means comprising mating components;
   d. said coupling means incorporating latch means for releasably locking said components in interconnected position;
   e. a seat support structure for said sulky frame means including a seat mount and seat;
   f. said seat support structure also including a rear seat support frame comprising upwardly extending, vertically transversely inwardly inclined posts connected between said seat mount and axle means; and
   g. a releasable front seat structure brace element extending downwardly at a vertically inclined angle connected between said seat support structure and said sulky frame means.

2. The invention defined in claim 1 wherein one of said components is a projection with a vertically upwardly extending hoe-like planar blade thereon and the other component is a scabbard open at its one end to provide a planar slit for snugly receiving said blade.

3. The invention defined in claim 2 wherein a tow bar is interconnected between said front wheel unit and said sulky frame means.

4. The invention defined in claim 2 wherein said scabbard has side, front and rear walls receiving said blade between them, and said walls and blade have aligned openings; a lock plate with stud means extending through the openings; said stud means having a recess therein; detent plunger means normally biased to be received in said recess but movable outwardly out of said recess; means for locking said plunger means in received position; and manipulatable means for moving said lock plate to remove said stud means from said openings in said blade and one of said front and rear walls when said plunger means is moved outwardly.

5. The invention defined in claim 4 wherein said means for locking said plunger means comprises a plunger housing having a threaded portion and said plunger has a threaded portion adapted to mate therewith.

6. The invention defined in claim 5 wherein a spring is provided in said housing in engagement with the plunger means to bias said plunger means.

7. A disassemblable three wheeled, sulky vehicle for the handicapped and others desiring assistance comprising:
   a. a steerable front wheel unit comprising a steering column mounting assembly connected with a front wheel;
   b. a sulky frame assembly for supporting a pair of transversely spaced apart rear wheels in tricycle formation with said front wheel, and including a pair of transversely spaced rigid axle means with rear wheels journaled thereon;
   c. a towing part on said front wheel unit;
   d. coupling means for detachably securing the towing part and sulky frame assembly comprising interacting components;
   e. said coupling means incorporating latch means for releasably locking said components in interconnected position;
   f. a seat structure for said sulky frame assembly mounted on the upper end of said sulky frame assembly;
   g. said sulky frame assembly comprising a bottom frame having a rear rigid axle means supporting member rigidly spanning said pair of rigid axle means; and
   h. a pair of upwardly extending demountable frame means for supporting said seat structure from said bottom frame, said seat supporting frames means being releasable to fold into a juxtaposed position with said bottom frame.

8. The invention defined in claim 7 wherein one of said upwardly extending frame means is pivotally connected to said bottom frame and releasably secured to said seat structure.

9. The invention defined in claim 7 wherein one of said upwardly extending frame means is a front strut member which releasably connects between said seat structure and bottom frame.

10. The invention defined in claim 9 wherein said seat structure has a socket for pivotally mounting said strut member.

11. The invention defined in claim 7 wherein said bottom frame is pivotally mounted on said axle means supporting member.

12. The invention defined in claim 7 wherein said tow bar is releasably coupled to said sulky frame assembly; said coupling means comprising interacting planar blade and planar scabbard components, and latch means for releasably locking said components in interconnecting position.

13. The invention defined in claim 12 wherein said scabbard has front and rear walls receiving said blade between them, and said walls and blade have aligned openings; a lock plate with stud means extending through the openings; said stud means having a recess therein; detent plunger means normally biased to be received in said recess but movable outwardly out of said recess; means for locking said plunger means in received position; and manipulatable means for moving said lock plate to remove said stud means from said openings in said blade and one of said front and rear walls when said plunger means is moved outwardly.

14. The invention defined in claim 7 wherein said axle means includes a wheel journaling fitting receiving each end of said axle means supporting member; each fitting and end of said rigid axle means supporting member having aligned openings therein; and a releasable plunger received in said openings for releasably securing said fittings in fixed position on said ends of said axle means supporting member.

15. The invention defined in claim 14 wherein said releasable plunger is normally biased by a plunger housing and spring to be received in said openings; and threaded cap means on said plunger has threaded engagement with said housing to lock said plunger in axial position.

16. The invention defined in claim 7 wherein said tow bar is an angle shaped member having a raised platform which releasably couples to said drive unit; said angle shaped member carrying laterally projecting foot rests.

* * * * *